UNITED STATES PATENT OFFICE.

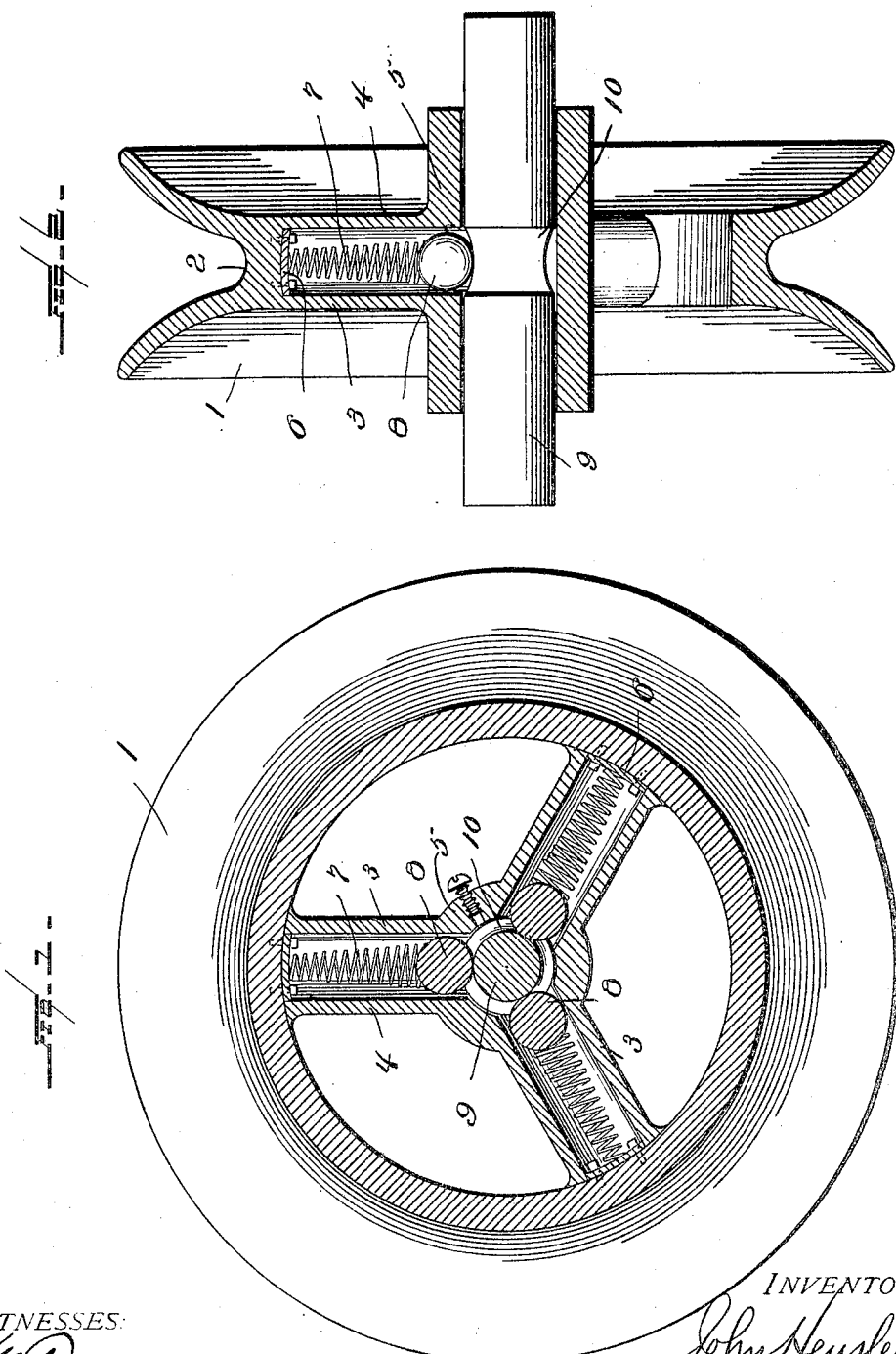

JOHN HENSLEY, OF HUNTINGTON, INDIANA.

SELF-LUBRICATING TROLLEY-WHEEL.

No. 807,463.

Specification of Letters Patent.

Patented Dec. 19, 1905.

Application filed July 8, 1905. Serial No. 268,840.

*To all whom it may concern:*

Be it known that I, JOHN HENSLEY, a citizen of the United States, residing at Huntington, in the county of Huntington and State of Indiana, have invented new and useful Improvements in Self-Lubricating Trolley-Wheels, of which the following is a specification.

My invention relates to improvements in trolley-wheels, and pertains more particularly to the lubrication of the same.

The object of my invention is to provide a trolley-wheel of this character which is provided with grease-containing cavities from which the grease is positively fed to the bearing-surface. In wheels of this type the grease by centrifugal force is normally thrown to the outer ends of the grease-cavities, and thus the bearing-surface, which necessarily is at the center of the wheel, is not properly lubricated, while in my device I provide a positive means by which the grease is carried to the bearing-surface.

In the accompanying drawings, Figure 1 is a vertical transverse sectional view of a trolley-wheel mounted upon the journal and showing my invention applied thereto, and Fig. 2 is a vertical longitudinal sectional view.

Referring now to the drawings, 1 represents my improved trolley-wheel, which is preferably made of the type shown—that is, with the outer peripheral rim having a groove 2, forming the trolley-bearing surface, and the said rim being supported by the radially-arranged spokes 3, which are hollow, forming the grease-containing cavities 4. While I have shown my wheel constructed in this manner, it will be understood that the peripheral rim may be supported by a solid center and which would in such a case be provided with the desired number of grease-containing cavities. The said grease-containing cavities 4 within the spokes communicate with the center bearing-surface 5 of the trolley-wheel and in the ordinary form are filled, through the capped orifice 10, with grease which is normally of such a consistency that it is readily fed to the journal, and by centrifugal force during the fast rotation of the trolley-wheel the grease is forced toward the outer ends 6 of the cavities, and thus the journal is not properly lubricated. In order to obviate this difficulty, I provide each cavity with conical-shaped coil-springs 7. The said springs are comparatively weak and have their smaller inner end adjacent the ends 6 of the grease-cavities, and thus allow of the ready compression of the springs within the outer ends of the cavities. The enlarged inner ends of the springs carry balls 8, made of lead, steel, or other metal, for the purpose of making the same heavier, and thus more readily acted on by centrifugal force, the said balls being adapted to bear upon the journal 9 when the trolley-wheel is at rest and freely rotate within the enlarged ends of the springs, the balls being of such a size that they cannot pass within said springs. The journal 9 at its center is provided with a circumferential groove 10, into which the balls 8 are forced by the springs.

The grease-containing cavities are filled with grease of any character, and upon the rotation of the trolley-wheel the balls 8 by force of gravity travel outwardly through the grease and compress the springs and are thus held by centrifugal force during the rotation of the trolley-wheel. While in this position, and the balls being heavier than the grease, they will travel through the grease, leaving the same on the inside thereof, and when the trolley-wheel is stopped the tension of the springs is sufficient to force the balls inwardly, thus carrying the grease before it to the bearing-surface. This operation continues during each rotation of the trolley-wheel and stopping of the same. It will thus be seen that the grease is positively and properly fed to the bearing-surface.

Having thus fully described my invention, what I claim as new, and desire to secure by Letters Patent, is—

1. A trolley-wheel having grease-containing cavities, coil-springs therein, balls engaged by the inner ends of the springs and resting upon the journal, whereby by centrifugal force the balls travel outwardly through the grease during the rotation of the wheel and are forced inwardly by the springs carrying the grease to the journal bearing-surface when the wheel is at rest.

2. A trolley-wheel having grease-containing cavities communicating with a central journal-surface, conical-shaped weak coil-springs within said cavities, metal balls rotatably mounted within the inner enlarged ends of said coil-springs, whereby the balls by centrifugal force are forced outwardly through the grease during the rotation of the wheel and are forced inwardly by the springs carrying the grease to the journal bearing-surface when the wheel is at rest.

3. The combination of a trolley-wheel having a central bore therein, of a journal passing through said bore and having at its center a peripheral groove, the said trolley-wheel having grease-containing cavities, conical-shaped weak coil-springs within said cavities, metal balls rotatably mounted within the outer enlarged ends of said coil-springs and bearing within the peripheral groove of the journal, whereby the balls compress the springs by centrifugal force and travel outwardly through the grease during the rotation of the wheel and are forced inwardly carrying the grease with the same when the wheel is at rest.

In testimony whereof I have signed my name to this specification in the presence of two subscribing witnesses.

JOHN HENSLEY.

Witnesses:
U. S. LESH,
EBEN LESH.